Nov. 7, 1967  J. R. ALBERTS ETAL  3,351,326
PROCESS AND APPARATUS FOR SOLIDS BLENDING
Filed Oct. 7, 1964  2 Sheets-Sheet 1

JAMES R. ALBERTS
PHILLIP W. HAWLEY
INVENTORS

BY
*Fred S. Valles*
ATTORNEY

Nov. 7, 1967   J. R. ALBERTS ET AL   3,351,326
PROCESS AND APPARATUS FOR SOLIDS BLENDING
Filed Oct. 7, 1964   2 Sheets-Sheet 2

JAMES R. ALBERTS
PHILLIP W. HAWLEY
INVENTORS

BY Fred S. Valles
ATTORNEY

United States Patent Office 3,351,326
Patented Nov. 7, 1967

3,351,326
PROCESS AND APPARATUS FOR
SOLIDS BLENDING
James A. Alberts, San Marino, Calif., and Phillip W.
Hawley, Odessa, Tex., assignors to Rexall Drug
and Chemical Company, Los Angeles, Calif., a corporation of Delaware
Filed Oct. 7, 1964, Ser. No. 402,071
10 Claims. (Cl. 259—95)

This invention relates to a process and an apparatus for the blending of solids, and particularly, to an improved type of gravity-flow solids blender adapted to withdraw solids simultaneously from a multiplicity of levels, and if necessary, re-blend the same through a recycling operation.

In industry, it is frequently necessary to blend solids, particularly where the material to be blended is derived from individual batch operations. However, it has been difficult to obtain products from such solids of a satisfactory homogeneous composition. This problem arises frequently in the manufacture of thermoplastics, involving for example, polyethylene and polypropylene pellets which can be in the form of cubes measuring around $\frac{1}{16}$ to $\frac{1}{4}$ inch on a side. In prior art blending devices it has heretofore been the general practice to blend solids by means of tumbling such as with double cone blenders or by a screw type mixer adapted to agitate the entire mass of material while confining the solids within a vessel.

It has also been proposed in the prior art that a blending vessel be utilized having means therein for withdrawing solids from a number of random points and levels. These means, generally constitute tubes, each having a plurality of openings at different vertical locations therein. Although this type of blending apparatus is superior to the screw type mixer apparatus, nevertheless it is subject to inaccuracies in the blending consistency of the solids. Thus, blenders and mixers as mentioned above have proved to be too expensive in operation and difficult to maintain, whereas the blender having tubes, each of which has a multiplicity of holes, has been proved to provide a solids product lacking the necessary degree of uniformity.

Accordingly, it is an object of this invention to provide an apparatus for solids blending, functioning entirely by gravity flow except for the power required to recycle the product in order to produce a solids product having improved homogeneity of composition.

It is a further object of this invention to provide an apparatus for blending which will facilitate a more uniform withdrawal of solids from all levels of the blending apparatus.

Still another object is to provide a blender which will control the blending of the solids material at all vertical height levels of the apparatus irrespective of the sizes and shapes of the solid pellets or other forms.

Still an additional object of this invention is to provide a blender bundle which can be manufactured for installation in an existing storage vessel and perform the above mentioned functions.

A still further object of this invention is to provide an improved process for blending a mass of heterogeneous solids to obtain a solids product having improved homogeneity of composition.

The manner in which these and other objects of this invention will be obtained will become apparent from the following detailed description and drawings, in which.

In general, the blending operation according to this invention comprises placing a substantial mass of a solids material, as for example, polyethylene, polypropylene, polystyrene, polyvinyl chloride pellets or other flowable solids such as grains, etc., in a vertically upright blending vessel and withdrawing material, preferably in substantially equal portions, from the vessel from a number of specifically selected points and elevations to obtain a uniform and homogeneous mixture. This withdrawal of the material is obtained through the use of a multiplicity of tubes placed lengthwise within said vessel and spaced throuhout the confines thereof in substantially equiangular fashion around said confined mass and extend vertically therethrough for substantially the entire height of the vessel. Each of these tubes has one vertically elongated slot or other shaped hole therein adapted to receive solids from the blending vessel. None of the slots or openings in one embodiment of this invention in any of the tubes is placed at identical heights. The slots are designed and spaced one below the other in each separate tube to cover the full range of material placed within the vessel and consequently, facilitate the withdrawal of substantially equal portions of material simultaneously from all levels of the solids material in the vessel. All of the solids withdrawn from the tubes and the blending vessel are deposited into a blending chamber which is in communication with a conveyor system or conduit adapted to either recycle the material to the blending vessel for further blending and mixing or to convey the material to another source for further treatment.

Figure 1:
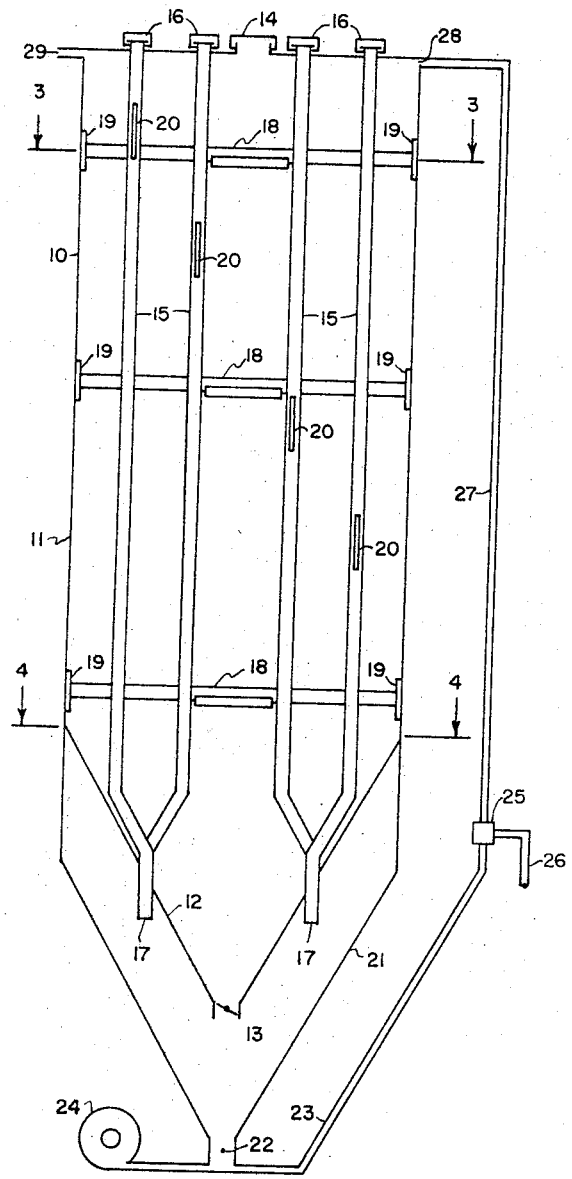
FIGURE 1 is a front elevation view, partially in schematic, of one embodiment of the blender according to this invention, with all valve details omitted.
Figure 2:
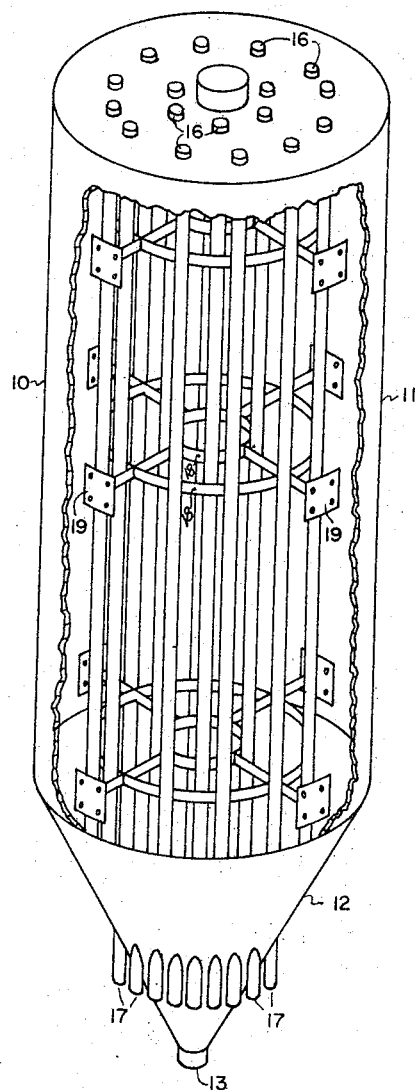
FIGURE 2 is a front elevation isometric view of the blender bundle of FIGURE 1.

Referring to FIGURE 1, there is illustrated a blender 10 having an upright housing 11 and an inverted lower conical section 12. The blender 10 has an outlet port 13 at the apex of the conical section 12 and a products inlet opening 14 at its upper portion. The inlet opening may also serve as a manhole cover to facilitate cleaning of the blender. A number of vertically extending hollow tubes 15 are placed in a predetermined pattern within the confines of the housing 11 and extend through substantially the entire vertical height of the housing. The number of tubes can vary depending on the size of the vessel and therefore it is not practical to cite the number which can be used. This will readily be apparent to those skilled in this art. The upper portions of the tubes 15 project through the top of the blender 10 and are adapted to be capped by closures 16 which are preferably removable to facilitate cleaning of the tubes 15 when required. The lower ends of the tubes 15 project through the wall of conical section 12 of the blender 10 and include openings 17 for the withdrawal of any solids entering the tubes 15. The lower ends of the tubes 15 are arranged, in the preferred embodiment of this invention, so that they discharge solids on a common radius and not in random fashion. This common radius concept and alignment of the lower ends of the tubes is depicted by the broken line in FIGURE 4 where it is clearly illustrated that the solids discharged from openings 17 fall on a common radius thereby simulating a circle. Also as illustrated in FIGURE 2, this arrangement of the lower ends of the tubes can be provided by bending the outer circle of tubes in and the inner circle of tubes out so that their ends circumscribe a circular design (dotted line of FIGURE 4). A better blending of discharged solids is achieved by this technique than if the solids were discharged randomly into the lower conical section 12 of the blender.

Each of the tubes 15 is provided with a vertically elongated slot 20 or other suitable opening which will place the hollow interior of the tubes in communication with the interior of the housing 11. Thus, any solids in the housing 11 adjacent to the various slots 20 will permit a portion of the material to enter the tube 15 of that respective slot 20 adjacent to the solids and allow it to be withdrawn through openings 17. The slots 20 in this embodiment of the invention are arranged so that none of them is at the same vertical height within the housing 11 and preferably the vertical slot positioning should be arranged so that the total sum of the height of all the slots 20 is substantially equal to the height of the housing 11 or at least equal to the uppermost level from which solids will be withdrawn from the blender. In effect, for example, if the housing 11 has a height of thirty feet, the ideal situation would be to provide a bundle of thirty tubes 15, each having one slot 20, one foot in length, with the slots positioned so that the bottom of the uppermost slot is approximately at the height of the top of the next lower slot. Consequently, this would assure withdrawal of material simultaneously from all elevations of the housing 11 containing solids material.

FIGURE 2 of the drawing illustrates a preferred arrangement of the blender internal bundle which can be fabricated as a unit and can be adapted for installation in an existing storage vessel, for example, with but minor modifications of such vessel. In this arrangement it can be seen that the composite tube bundle comprises an outer circle of tubes joined as indicated by support brackets 18 and an inner circle of tubes likewise joined to said support brackets, the particular spacing arrangement of the outer and inner tube bundles being clearly illustrated in FIGURE 3.

Figure 3:
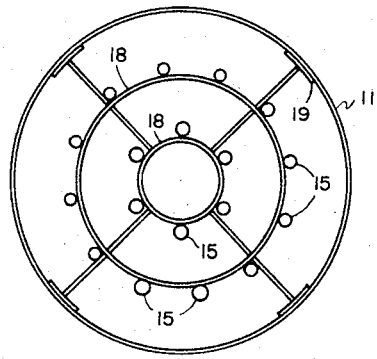
FIGURE 3 is a plan view section on line 3—3 of FIGURE 1.
Figure 4:
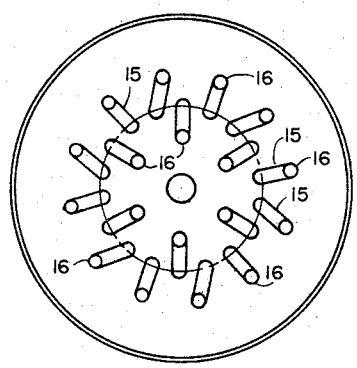
FIGURE 4 is a plan view section on line 4—4 of FIGURE 1 showing a preferred arrangement of the discharge outlets of the blender tubes.

In order to assure the rigidly supported and preferable spacing for the tubes 15, a plurality of support brackets 18 are provided at spaced vertical intervals throughout housing 11. A clearer description of these supports 18 is shown in FIGURES 2, 3 and 4 of the drawings. The radially outermost ends of the support brackets 18 are connected to flanges 19 which are adapted to be attached to the inner wall of housing 11 in a known manner, as for example, riveting, bolting, or welding. These flanges or "shoes" also allow for installation of the blender bundle in an existing storage vessel because they are the skids for sliding the bundle into the shell and provide the supports when attached to the shell. FIGURES 2 and 3 in particular show the spacing arrangement of tubes 15 with respect to support brackets 18 and their attachment thereto. FIGURE 4 illustrates, as hereinbefore indicated, how the inner and outer tubes can be bent so that they will discharge solids on a common radius (indicated by the broken line).

A blending chamber 21 is positioned below the conical section 12 of the blender 10 and is adapted to receive blended solids material from the outlet port 13 of the blender housing 11 and openings 17 of the tubes 15. The entire blended product then moves through an outlet port 22 at the bottom of the blending chamber 21 into a conveying conduit 23. A pneumatic blower 24 or similar power device is positioned in direct connection with conduit 23 in order to facilitate movement of the blended product therethrough. Conduit 23 leads to a valving arrangement 25 which may be manually or automatically activated to alternatively have the product recycled to the blender 10 by means of conduits 27 and 28 in order to provide a still further blend of the material; or if the blending is satisfactory, have the blended product conveyed to another source (not shown) through a conduit 26. In order to add new solids material to the blender housing 11 an inlet port 29 may be provided at the upper portion in lieu of utilizing manhole opening 14 for this purpose. As indicated hereinbefore, for simplicity, none of the valving arrangements is herein described in detail, as such arrangements are readily within the skill of the art.

Figure 5:
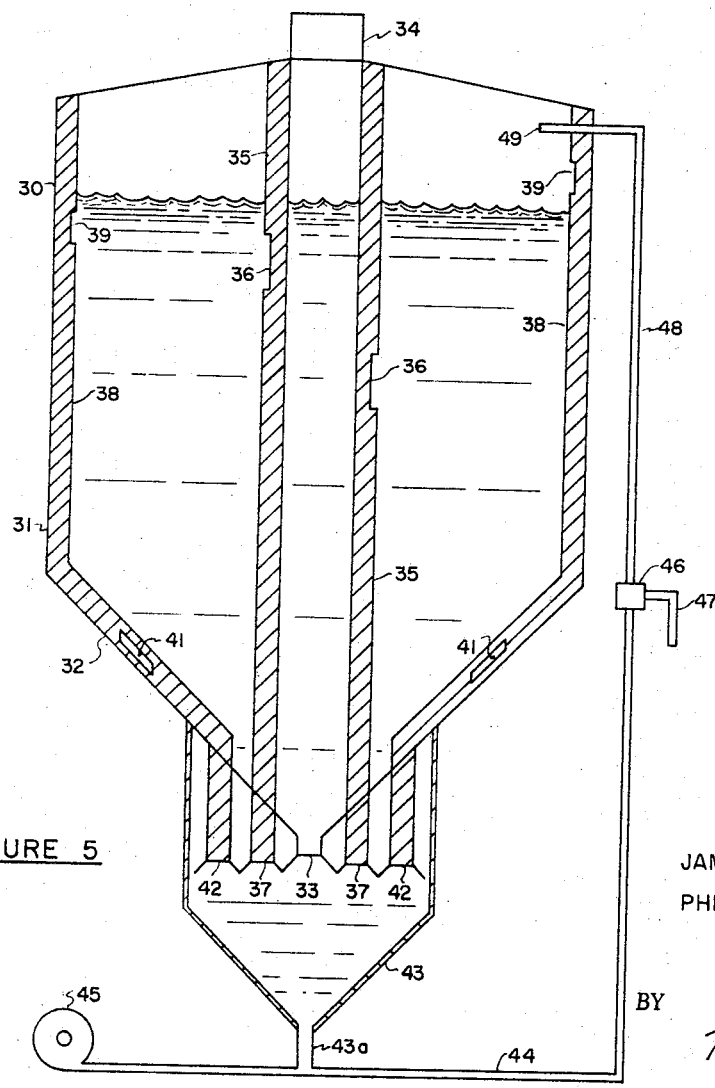
FIGURE 5 is a front elevation view, partially in schematic, of a second embodiment of the blender according to this invention, with all valve details omitted.

A second embodiment of the solids blender is shown in FIGURE 5 of the drawings which, in essence, is quite similar in operation to the blender of FIGURE 1. Thus, blender 30 provides for an upright housing 31 having at its bottom an inverted substantially conical section 32 which has at its apex portion an outlet port 33 permitting solids material to be withdrawn from the blending vessel. A multiplicity of tubes 35 quite similar in operation and construction to tubes 15 shown in the previous blender embodiment extend through the vertical height of the housing 31. Each of the tubes 35 has provided therein a vertical slot 36 quite similar to slots 20. The lower ends of the tubes project through conical section 32 to provide product outlet ports 37 whereas the lower ends of channel members 38 include openings 42. The upper portion of blender 30 may include a manhole cover opening 34 which may also be adapted to provide a solids inlet port.

Located within housing 31 and conical section 32 are a series of circumferentially positioned spaced upright channel members 38. The channel members 38 are attached to the inner peripheral wall of the blender 30 to provide passageways for solids material which is withdrawn from the interior of the blender by means of slots 39 cut into the web of the channel members 38.

It has been found that a non-homogeneous mixture tends to formulate near the end of the withdrawal of the material within the lower region of the blender 30 defined by the conical section 32. The present blender construction overcomes this deficiency by providing side holes or openings 41 in the legs of the channels 38 near to or adjacent to the inner wall of the conical section 32. The solids material withdrawn from housing 31 and tubes 35 by means of ports 33, 37 and 42 collects in a blending chamber 43 including an opening 43a to permit blended product to fall into a conveying conduit 44. In this embodiment of the invention in order to approximate the common radius discharge concept method above, the lower discharge ends of the tubes or channels 38 adjacent the blender were enlarged somewhat to provide a faster flow of solids and an approximation of the flow rates from the inner tube bundle (tubes 35). A pneumatic blower or power device 45 then facilitates movement of the blended product through a valve arrangement 46. Valve arrangement 46 in operation is identical to valve arrangement 25 of the embodiment of blender 10 and will alternatively recycle the blended material to the blender 30 by means of a conduit 48 and a port 49, or convey the blended material to another source (not shown) through a conveying conduit 47.

In tests carried out to determine the blending efficiency of the preferred embodiment of the novel blender of this invention, substantially 100,000 lb. lots of polyethylene pellets were employed. In one test colored pellets were used as the minor component of the blend and the amount used provided a nominal blend limit of 25:1. After 4 hours recirculation time of the blender contents an average concentration of colored component in the blend (based on 27 samples of blended product taken approximately every three minutes from the discharge stream of the blender) of 4.05% was obtained. With statistical allowance made for errors made in sampling and analysis, all samples were well within ±5% of a theoretically perfect blend. A second test with a nominal blend limit of 8:1 after a recirculation time of 2 hours resulted in a weighted average concentration of 11.2% of the colored component. Again all individual samples were within ±5% of a perfect blend.

From the foregoing it will be understood that this invention constitutes an improvement in a process for solids blending and apparatus therefor which can be modified within the skill of the art without departure from the spirit of this invention is only limited by the scope of the following claims.

What is claimed is:

1. A gravity-flow solids blender comprising an elevated vertical vessel having material inlet means in its upper portion and a material outlet port in its bottom portion, a plurality of spaced hollow vertical members positioned concentrically within said vessel, said members being arranged to form at least two concentric circles in substantially equiangular relation and adapted to extend through the bottom portion of said vessel, said members having outlet ports at their bottom extremities, each of said members having one material receiving opening in communication with the interior of said vessel, and each of said openings being spaced substantially immediately one below the other along the vertical length thereof to receive substantially equal portions of material simultaneously from all levels of the blender, and including means for the common collection of material passing through said vessel and member outlet ports.

2. In a gravity-flow solids blender, the combination of an elevated vertical cylindrical vessel having material inlet port in its upper portion and a material outlet port in its lower extremity, a plurality of spaced hollow tubes and support means for said tubes provided at spaced intervals within said vessel, said tubes positioned concentrically within said vessel, said tubes being spaced in substantially equiangular relation, said tubes extending vertically substantially the full height of said vessel and protruding through the bottom wall portion of the latter, each of said tubes having one material receiving opening therein in communication with the hollow center of said tube and the interior of said vessel and each of said openings being spaced substantially immediately one below the other along the vertical length thereof to receive substantially equal portions of material simultaneously drawn from all levels of the blender, a collecting chamber below said vessel, the lower distal ends of said tubes and the material outlet port of said vessel communicating with said chamber to convey material thereto, and material conveying means in communication with said chamber whereby material passing therefrom can be alternately reconveyed to said vessel and recirculated or conveyed to another source.

3. A process for blending a mass of heterogeneous solids consisting essentially in confining said mass in an elevated vertical column, withdrawing from said confined mass by gravity flow within said confined mass substantially equal portions of solids simultaneously from all levels of the solids in the vessel from a series of withdrawal areas positioned lengthwise throughout the confined mass, said withdrawal areas being further positioned concentrically within said elevated column and arranged to form at least two concentric circles and spaced substantially immediately one below the other for the vertical height of the column in substantially equiangular relation with respect to said confined mass and combining said withdrawn amounts of solids to produce a solids blend having improved homogeneity of composition.

4. Apparatus adapted for use in combination with a hollow vertical vessel for blending of solid materials comprising a plurality of spaced hollow vertical tube members arranged so that when placed within said vessel, said tubes are positioned concentrically within said vessel, said tubes arranged to form at least two concentric circles and said tubes being fixed in substantially equiangular relation and adapted to extend through the bottom portion of said vessel, each of said tubes having one elongated vertical slot therein in communication with the hollow center of said tube, each said slot being positioned substantially immediately one below the other along the vertical length thereof, support means for said tubes provided at spaced intervals and flange means in association with said support means for positioning and fixing said spaced hollow tubes within said hollow vessel.

5. A gravity-flow solids blender comprising an elevated vessel having material inlet means in its upper portion and a material outlet port in its bottom portion, a plurality of spaced hollow vertically extending channel members positioned in spaced relation about the periphery within said vessel in substantially equiangular relation and adapted to extend through the bottom portion thereof and attached thereto in such a manner that the web and feet of each channel member and inner wall of said vessel define a closed passageway extending through the bottom wall portion of said vessel, each of said channel members having an outlet port at its lower extremity and at least one material receiving inlet opening in communication with the interior of said vessel.

6. A blender as defined in claim 5, wherein the bottom portion of said vessel includes an inverted conical section, the apex of which comprises said vessel outlet port, at least some of said channel members having a second opening in communication with the interior of said vessel in the region below the base portion of said inverted conical section.

7. A blender as defined in claim 1 wherein each of said hollow vertical members have only one material receiving opening and each such opening is positioned at a different vertical height within said vessel.

8. A blender according to claim 2 wherein the lower distal ends of the hollow vertical tubes are positioned so that they discharge material on a common radius.

9. The process of claim 3 wherein the amounts of withdrawn solids are combined in a common radius.

10. The process of claim 3 wherein the withdrawn and combined amounts of solids are subjected to reblending by recirculation thereof to said elevated column.

References Cited

UNITED STATES PATENTS

| 2,548,262 | 4/1951 | Hintz | 259—180 |
| 3,066,920 | 12/1962 | Prosser | 259—180 |
| 3,094,243 | 6/1963 | Haugen | 259—180 |
| 3,138,369 | 6/1964 | Bennett et al. | 259—95 |

WALTER A. SCHEEL, *Primary Examiner.*

ROBERT W. JENKINS, *Examiner.*